(12) United States Patent
Burton et al.

(10) Patent No.: US 11,379,863 B1
(45) Date of Patent: Jul. 5, 2022

(54) SYSTEMS AND METHODS FOR DETERMINING CUSTOMER METRICS

(71) Applicant: Wells Fargo Bank, N.A., San Francisco, CA (US)

(72) Inventors: Anthony Burton, Charlotte, NC (US); Chris Kalaboukis, San Jose, CA (US); Orsolya Oldroyd, Walnut Creek, CA (US); Margot Lockwood-Stein, Palo Alto, CA (US); Paul Vittimberga, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 270 days.

(21) Appl. No.: 15/612,069

(22) Filed: Jun. 2, 2017

Related U.S. Application Data

(60) Provisional application No. 62/491,295, filed on Apr. 28, 2017.

(51) Int. Cl.
*G06Q 30/02* (2012.01)
*G06Q 50/00* (2012.01)
*G06Q 10/06* (2012.01)

(52) U.S. Cl.
CPC ....... *G06Q 30/0202* (2013.01); *G06Q 10/067* (2013.01); *G06Q 30/0282* (2013.01); *G06Q 50/01* (2013.01)

(58) Field of Classification Search
CPC combination set(s) only.
See application file for complete search history.

(56) References Cited

U.S. PATENT DOCUMENTS

| 7,974,889 B2 | 7/2011 | Raimbeault |
| 8,001,044 B2 | 8/2011 | Davis |

(Continued)

FOREIGN PATENT DOCUMENTS

AU 2017200066 A1 * 7/2017

OTHER PUBLICATIONS

Johnson, S.D., et al. "A pricing mechanism using social media and web data to infer dynamic consumer valuations," 2015 IEEE International Conference on Big Data (Big Data), 2015, pp. 2868-2870 [online], [retrieved on Jan. 12, 2022]. <https://ieeexplore.ieee.org/stamp/stamp.jsp?tp=&arnumber=7364105> (Year: 2015).*

(Continued)

*Primary Examiner* — Jerry O'Connor
*Assistant Examiner* — Michael R Koester
(74) *Attorney, Agent, or Firm* — Foley & Lardner LLP

(57) ABSTRACT

A financial institution computing system includes an account database configured to store a plurality of transaction statistics with respect to a financial account of a customer, a social media database configured to store a plurality of social media activities of the customer, and a customer metric management circuit. At least one of the plurality of transaction statistics is indicative of a first transaction between the customer and a merchant. The customer metric management circuit is configured to determine a probability model of the customer based on the plurality of transaction statistics and the plurality of social media activities of the customer. The probability model indicates a probability that the customer will conduct a second transaction with the merchant in the future. The customer metric management circuit is further configured to provide the probability model of the customer to a device associated with the merchant.

21 Claims, 4 Drawing Sheets

(56) References Cited

U.S. PATENT DOCUMENTS

| | | |
|---|---|---|
| 2002/0165755 A1 | 11/2002 | Kitts |
| 2004/0034570 A1* | 2/2004 | Davis ................. G06Q 30/0229 |
| | | 705/7.31 |
| 2008/0046317 A1 | 2/2008 | Christianson et al. |
| 2012/0296698 A1 | 11/2012 | Su |
| 2013/0166379 A1 | 6/2013 | Ehindero et al. |
| 2013/0173419 A1 | 7/2013 | Farber et al. |
| 2014/0103631 A1 | 4/2014 | Chan et al. |
| 2014/0122228 A1 | 5/2014 | Wical |
| 2014/0278795 A1* | 9/2014 | Satyamoorthy .... G06Q 30/0201 |
| | | 705/7.33 |
| 2014/0279208 A1 | 9/2014 | Nickitas et al. |
| 2015/0235238 A1 | 8/2015 | Babinowich et al. |
| 2016/0171536 A1 | 6/2016 | Garg et al. |
| 2016/0189210 A1 | 6/2016 | Lacey et al. |
| 2016/0253688 A1* | 9/2016 | Nielsen ................. G06F 16/337 |
| | | 705/7.31 |
| 2017/0278125 A1* | 9/2017 | Tietzen .................. G06Q 20/12 |
| 2018/0060843 A1* | 3/2018 | Maheshwari ...... G06Q 20/3224 |

OTHER PUBLICATIONS

Lassen et al., "Predicting iPhone Sales from iPhone Tweets", Enterprise Distributed Object Computing Conference (EDOC), 2014 IEEE 18th International, IEEE, 2014. 10 pages.

* cited by examiner

US 11,379,863 B1

SYSTEMS AND METHODS FOR DETERMINING CUSTOMER METRICS

CROSS-REFERENCE TO RELATED APPLICATIONS

This application claims the benefit of priority to U.S. Application No. 62/491,295 filed Apr. 28, 2017, entitled "SYSTEMS AND METHODS FOR DETERMINING CUSTOMER METRICS", which is hereby incorporated by reference in its entirety.

BACKGROUND

Merchants may wish to understand certain information about their customers and utilize that information to improve their business. Such information may include social attributes and financial information with respect to individual customers.

SUMMARY

According to various embodiments, a financial institution computing system includes an account database, a social media database, and a customer metric management circuit. The account database is configured to store a plurality of transaction statistics with respect to a financial account of a customer, at least one of the plurality of transaction statistics indicative of a first transaction between the customer and a merchant. The social media database is configured to store a plurality of social media activities of the customer. The customer metric management circuit is configured to determine a probability model of the customer based on the plurality of transaction statistics and the plurality of social media activities of the customer, the probability model indicating a probability that the customer will conduct a second transaction with the merchant in the future. The customer metric management circuit is further configured to provide the probability model of the customer to a device associated with the merchant.

According to various embodiments, there is provided a method performed by a financial institution computing system. The method includes accessing, by a customer metric management circuit, an account database storing a plurality of transaction statistics with respect to a financial account of a customer, at least one of the plurality of transaction statistics indicative of a first transaction between the customer and a merchant. The method further includes accessing, by the customer metric management circuit, a social media database storing a plurality of social media activities of the customer. The method further includes determining, by the customer metric management circuit, a probability model of the customer based on the plurality of transaction statistics and the plurality of social media activities of the customer, the probability model indicating a probability that the customer will conduct a second transaction with the merchant in the future. The method further includes providing, by the customer metric management circuit, the probability model of the customer to a device associated with the merchant.

According to various embodiments, there is provided a non-transitory computer readable media having computer-executable instructions embodied therein that, when executed by a customer metric management circuit of a financial institution computing system, causes the financial institution computing system to perform operations. The operations include accessing, by a customer metric management circuit, an account database storing a plurality of transaction statistics with respect to a financial account of a customer, at least one of the plurality of transaction statistics indicative of a first transaction between the customer and a merchant. The operations further include accessing, by the customer metric management circuit, a social media database storing a plurality of social media activities of the customer. The operations further include determining, by the customer metric management circuit, a probability model of the customer based on the plurality of transaction statistics and the plurality of social media activities of the customer, the probability model indicating a probability that the customer will conduct a second transaction with the merchant in the future. The operations further include providing, by the customer metric manager circuit, the probability model of the customer to a device associated with the merchant.

DETAILED DESCRIPTION

Figure 1:
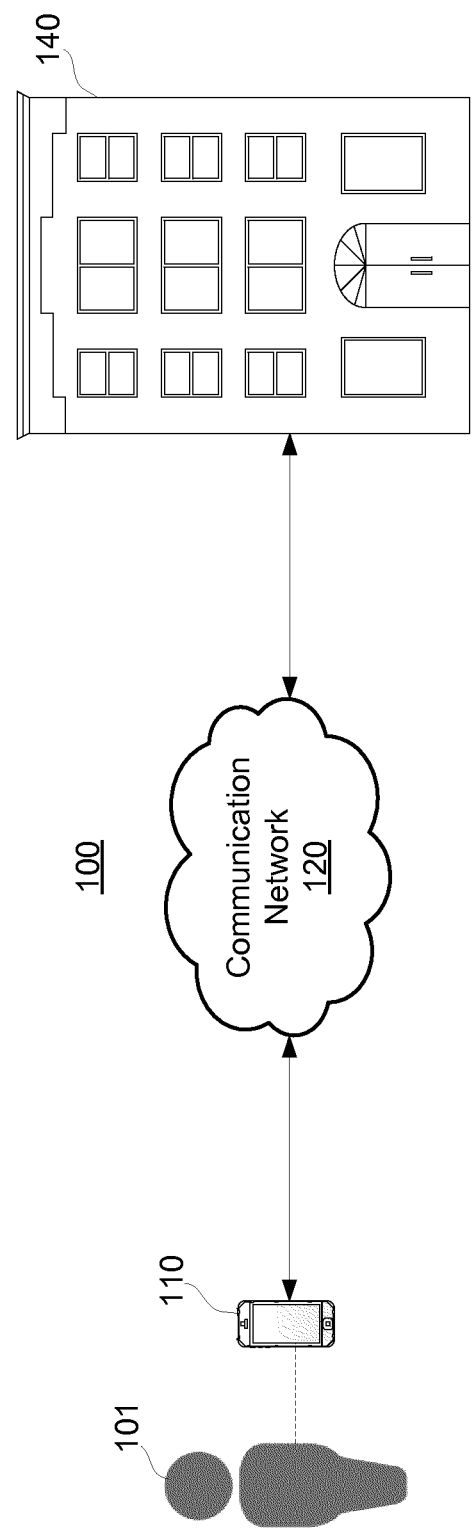
FIG. 1 is a block diagram illustrating a system for determining customer metrics according to some embodiments.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting. For example, various embodiments of systems and methods discussed herein may be relevant to any of a variety of circumstances where determining customer metrics for a merchant may be useful.

In various embodiments, systems and methods for determining customer metrics are discussed herein. A merchant may desire to understand certain metrics about their customers and utilize that information to improve their business. For example, a merchant may wish to determine metrics of a customer such as a likelihood or probability that the customer will return to their business and conduct a future transaction with the merchant, when the customer will return, how much the customer will likely spend, and so on.

In some embodiments, a financial institution has access to data of the customer for determining and providing these metrics to the merchant for use in the merchant's business. The data of the customer includes financial data (e.g., transaction history of the customer), social media data (e.g., posts, likes), and the like. The financial institution can access and perform operations on the data of the customer to create a probability model indicative of how likely the customer is to return to the merchant, when the customer will likely return, how much money the customer will likely spend, and so on. In some embodiments, the financial institution provides this information via a customer dashboard configured to present the customer metrics described herein at the merchant. Relatedly, in some embodiments, the dashboard suggests incentives (e.g., offers or coupons) for the merchant to present to a customer to increase a likelihood that that customer will return to the merchant.

Accordingly, determining incentives using the probability model of a customer allows incentives to be personally tailored and responsive to an individual customer's sentiment towards a merchant. Customer relations can be deepened by sending incentives to those customers that have a low probability of returning to the merchant (e.g., as identified and flagged by a financial institution computing system), and the probability that an incentivized customer returns can be increased. The use of transaction statistics and social media activities of customers can provide accurate determinations of behavior and sentiment metrics of a customer with respect to a merchant, revealing information that is otherwise unknown to the financial institution computing system or to a merchant computing system. By automatically determining such incentive recommendations at the financial institution computing system and by providing the recommendation to the merchant computing system for distribution to customers, based on transaction history and social media activity already available to the financial institution computing system (instead of passively receiving notifications from the customer), network resources and time are conserved. In addition, by having access to a dashboard illustrating relevant customer metrics, the merchant computing system also conserves computing and network resources by not having to individually investigate customer data and manually determine a likelihood of a customer returning (e.g., which would also be a more incomplete determination because the merchant computing system will likely not have access to the transaction statistics and social media activities to which the financial institution computing system has access).

In certain embodiments, customers of the merchants are also customers of a financial institution. However, example embodiments of systems and methods discussed herein may be relevant to any of a variety of circumstances where determining customer metrics for a person may be useful, whether or not that person is a customer of a financial institution.

Example embodiments of systems and methods discussed below are able to determine and provide metrics of customers to merchants based on information about the customers. In certain embodiments, any such information is stored in databases that are part of a system to determine customer metrics, or accessed from sources external to the system.

FIG. 1 is a block diagram illustrating a system 100 for determining customer metrics according to some embodiments for a merchant 101 of a financial institution 140. Referring to FIG. 1, in some embodiments, the merchant 101 is an account holder of at least one financial account at the financial institution 140. However, in other embodiments, the merchant 101 is not an account holder of a financial account at the financial institution 140, but, for example, utilizes services provided by the financial institution 140 (e.g., the customer metrics service described herein). The merchant 101 is associated with a merchant device 110. That is, the merchant 101 can use the merchant device 110 to access financial products and/or services provided by the financial institution 140 (such as, for example, the customer metrics service). Particularly, the merchant 101 can further make financial transactions (e.g., payments, deposits, or the like) with another party using the merchant device 110 or via another suitable method, or can perform financial transactions with respect to financial accounts held at the financial institution 140 (e.g., transfer of funds, withdrawal, deposit, payments, or the like).

In certain embodiments, the financial institution 140 includes any commercial or private financial institution, including, for example, commercial or private banks, credit unions, credit card companies, investment brokerages, or the like. In certain embodiments, in response to a received transaction request, the financial institution 140 is configured to authenticate the transaction information, authorize the transaction request, process the transaction or transfer funds accordingly. In certain embodiments, the financial institution 140 is configured to transmit data to the merchant device 120, such as, for example, indicating one or more metrics of one or more customers of the merchant 101, as further explained herein.

The merchant device 110 is connected to the financial institution 140 (e.g., a financial institution computing system 242 of FIG. 2) via a communication network 120. The communication network 120 is any suitable Local Area Network (LAN) or Wide Area Network (WAN). For example, the communication network 120 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The communication network 120 is structured to permit the exchange of data, values, instructions, messages, and the like between the merchant device 110 and the financial institution 140 (e.g., a financial institution computing system 242 of FIG. 2).

In some embodiments, the merchant device 110 includes one or more processors or non-transitory storage mediums housing one or more logics configured to enable the merchant device 110 to exchange data over the communication network 120, execute software applications, access websites, generate graphical user interfaces, and perform other similar operations. In certain embodiments, examples of the merchant device 110 include a computer such as a desktop or laptop computer, smartphones, tablets, wearable computing devices such as smartwatches, an infotainment system of a vehicle, a computing device in an appliance, a smart TV, and any other type of computing device.

Figure 2:
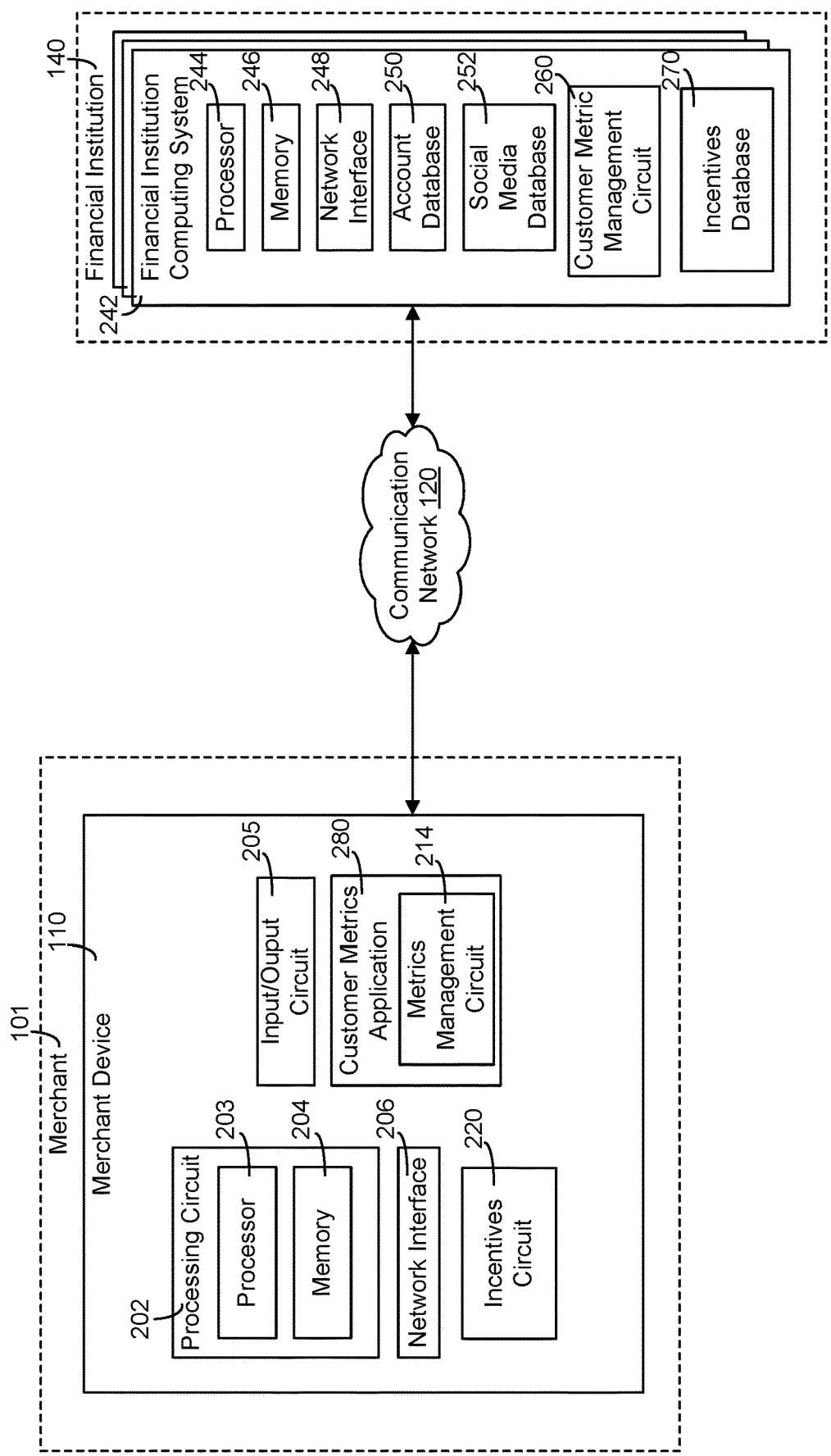
FIG. 2 is a block diagram illustrating an example of the system for determining customer metrics shown in FIG. 1 according to some embodiments.

FIG. 2 is a block diagram illustrating an example of the system for determining customer metrics shown in FIG. 1 according to some embodiments. FIG. 2 is a diagram of an example of the user device 110 and an example of the financial institution 140 in the system 100 set forth in FIG. 1, according to some embodiments. Referring now to FIGS. 1-2, the financial institution 140 includes one or more of a bank branch, loan office, mortgage office, financial services office, retail office, automatic teller machine (ATM) location, a combination thereof, and/or the like. The financial institution 140 has at least one associated financial institution computing system 242.

The financial institution 140 provides financial products and services such as, but not limited to, credit card accounts, checking/saving accounts, retirement accounts, mortgage accounts, loan accounts, investment and financial accounts, and the like to the customer 101 via the financial institution computing system 242. The financial institution computing system 242 includes a processor 244 and a memory device 246. The processor 244 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 246 (e.g., Random Access Memory (RAM), Read-Only Memory (ROM), Non-volatile RAM (NVRAM), Flash Memory, hard disk storage, etc.) stores data and/or computer code for facilitating at least some of the various processes described herein. The memory 246 is or includes tangible, non-transient volatile memory or non-volatile memory. In this regard, the memory 246 stores programming logic that, when executed by the processor 244, controls the operations of the financial institution computing system 242. In some arrangements, the processor 244 and the memory 246 form various processing circuits described with respect to the financial institution computing system 242 (e.g., the customer metric management circuit 260).

As shown, the financial institution computing system 242 includes a network interface 248. The network interface 248 is structured for sending and receiving data over the communication network 120 (e.g., to and from the merchant device 110, etc.). Accordingly, the network interface 248 includes any of a cellular transceiver (for cellular standards), local wireless network transceiver (for 802.11X, ZigBee, Bluetooth, Wi-Fi, or the like), wired network interface, combination thereof (e.g., both a cellular transceiver and a Bluetooth transceiver), and/or the like.

The financial institution computing system 242 includes an account database 250 that stores customer information and account information relating to one or more accounts held by a plurality of customers with the financial institution 140. In this regard, more than one financial institution (such as, but not limited to, the financial institution 140) with an associated financial institution computing system (such as, but not limited to, the financial institution computing system 242) can be communicably coupled to the components of FIG. 2 over the communication network 120 to access the accounts held by customers. The account database 250 stores transaction history of transactions made by customers of the financial institution 140 using one or more accounts of the customers. The transaction information for each transaction includes one or more of a transaction amount, transaction time, other party in the transaction, location of the transaction, or the like. As an example, the account database can include data in connection with a transaction that occurred by a customer of the financial institution 140, the data can include a transaction amount (e.g., a purchase price), the location of the purchase (e.g., address, section of a city, state, country, and the like), a time of the purchase (e.g., time of day, date, month, year, and the like), the other party in the transaction (e.g., the merchant 101 at which the customer made the transaction, or a different merchant or party at which the customer made the transaction), etc.

The financial institution computing system 242 includes a social media database 252 for storing information pertaining to social media accounts associated with customers of the financial institution 140. The social media database 252 can store various pieces of data retrieved from the social media accounts of the customers of the financial institution 140, such as, but not limited to, social media posts made by customers (e.g., posts that indicate a sentiment towards the merchant 101 or towards other merchants), location information (e.g., "check-ins"), social connections (e.g., friends list), indications of interest (e.g., "likes" or "up votes"), life events (e.g., upcoming birthdays), mentions or reviews of business or merchants, and the like.

The financial institution computing system 242 includes a customer metric management circuit 260. The customer metric management circuit 260 is capable of determining metrics of the customers of the financial institution 140. The customer metric management circuit 260 is operatively coupled to one or more of the components of the financial institution computing system 242. For example, the customer metric management circuit 260 is coupled to the network interface 248 for communicating with the merchant device 110 via the communication network 120. The customer metric management circuit 260 is coupled to one or more of the account database 250 or social media database 252 to access information stored thereon with respect to the transaction history and social media data of customers of the financial institution 140 to determine metrics of individual customers with respect to the merchant 101.

In some embodiments, the customer metric management circuit 260 parses the account database 250 to access transactions of customers and information associated with each of the transactions, as described above. In some embodiments, the customer metric management circuit 260 determines one or more social media accounts associated with a customer of the financial institution (e.g., a customer provides the financial institution 140 with their social media accounts), and parses information of the social media accounts to retrieve relevant information for storing in the social media database 252. For example, for a customer of the financial institution 140, the customer metric management circuit 260 retrieves a social media account link associated with the customer, access the link, parse the resulting webpage for relevant information, and store the relevant information in the social media database 252. Relevant information is information that pertains to the merchant 101, to competitors of the merchant 101, to the industry in which the merchant conducts business, information about the customer (e.g., birthdays, life events, or the like), location information of the customer, sentiments of the customer towards the merchant 101 or other businesses, and so on. For example, the circuit metric management circuit 260 parses the customer's social media account for instances that the customer has a *nexus* to the merchant 101 (e.g., a review of the merchant 101, a post mentioning the merchant 101, a check-in at the merchant 101, and so on).

In some embodiments, the customer metric management circuit 260 can determine metrics of customers with respect to the merchant 101 implicated by the customer's transaction history and social media activity. In some examples, the customer metric management circuit 260 is implemented with the processor 244. For example, the customer metric management circuit 260 is implemented as a software application stored within the memory 246 and executed by the processor 244. Accordingly, such examples can be implemented with minimal or no additional hardware costs. However, other implementations rely on dedicated hardware specifically configured for performing operations of the customer metric management circuit 260.

In some embodiments, the customer metric management circuit 260 creates a probability model of each customer that has previously visited the merchant 101 (e.g., previous visitation can be determined based on whether a customer has made a transaction at the merchant 101 in the past). The probability model created by the customer metric management circuit 260 indicates a probability that a specific customer will return to the merchant 101. The probability model further indicates when the customer will likely return to the merchant 101, how much money the customer will likely spend when the customer returns to the merchant 101, how much money the customer will likely spend at the merchant 101 over a period of time (e.g., over the next month, quarter, year, etc.), and the like.

In some embodiments, the customer metric management circuit 260 determines a probability model of a customer based on the transaction history and social media presence of the customer, as stored in the account database 250 and the social media database 252, respectively. The customer metric management circuit 260 can use the transaction and social media data of the customer to determine a sentiment of the customer towards the merchant 101, which can be used to determine the probability model of the customer returning to the merchant 101 for business.

In some embodiments, the customer metric management circuit 260 increases the probability that the customer will return to the merchant 101 in response to positive sentiments exhibited by the customer towards the merchant 101, as determined via the customer's transaction history and social media activity. For example, the customer metric management circuit 260 determines that the customer left a positive review of the merchant 101 on a social media website, the customer visits the merchant 101 regularly or semi-regularly (e.g., every week), the customer "likes" a webpage associated with the merchant 101, the customer writes a negative review of a competitor of the merchant 101, and so on. In addition, in some embodiments, the customer metric management circuit 260 decreases the probability that the customer will return to the merchant 101 in response to negative sentiments exhibited by the customer towards the merchant 101, as determined via the customer's transaction history and social media activity. For example, the customer metric management circuit 260 determines that the customer left a negative review of the merchant 101 on a social media website, the customer visited a competitor of the merchant 101, the customer discussed products or services different from those provided by the merchant 101, the customer writes a positive review of a competitor of the merchant 101, the customer visits businesses in the same industry as that of the merchant 101 only at locations that are far away from the merchant 101, and so on.

As an example, the merchant 101 is a restaurant that serves a particular type of food (e.g., Italian). A customer visits the restaurant and makes a transaction (e.g., purchase a meal), and the transaction is logged in the account database 250, which the customer metric management circuit 260 detects to determine that the customer visited and engaged in a transaction at the restaurant merchant 101. Afterwards, the customer generates a post on a social media account praising the food at the merchant 101, which the customer metric management circuit 260 detects and interprets by, for example, parsing the social media page of the customer and detecting keywords to determine that the posting pertains to the merchant 101 and whether the posting was positive or negative. The customer metric management circuit 260 then generates a probability model indicating the likelihood that the customer will return and conduct a transaction with the merchant, and because the customer metric management circuit 260 determined that the customer has a positive sentiment towards the merchant 101 based on the customer's social media post, the customer metric management circuit 260 attributes a relatively high percentage likelihood of return for the customer (e.g., 75% chance of return). However, at a later date, the customer creates a post praising another restaurant, and because that distracts the customer from the merchant 101 (e.g., resulting in a negative sentiment towards the merchant 101), the customer metric management circuit 260 reduces the percentage likelihood of return for the customer (e.g., to 65% chance of return). Similarly, in some embodiments, the transaction data from the customer's visit to the merchant 101 indicates that the customer spent $100, but at a later time, the customer visits another Italian restaurant and spends only $50. The customer metric management circuit 260 interprets this event as a negative sentiment towards the merchant 101 because the customer has found a similar type of restaurant that is cheaper, and the customer metric management circuit 260 therefore reduces the percentage likelihood of return for the customer. In some embodiments, the customer metric management circuit 260 indicates the percentage likelihood of return for a customer in relation to time periods. For example, the customer metric management circuit 260 indicates that a customer has a 30% chance of returning to the merchant 101 within the next month, a 50% chance of returning to the merchant 101 within the next three months, 60% chance of returning to the merchant 101 within the next six months, and so on.

In some embodiments, the customer metric management circuit 260 determines how much money a customer is likely to spend at the merchant 101 once the customer returns. In some embodiments, the customer metric management circuit 260 determines a likely amount that the customer will spend based on the customer's spending habits at other similar merchants. For example, the customer metric management circuit 260 determines that the customer is likely to spend $100 at the merchant 101 (e.g., a restaurant) if the customer typically spends $100 at other merchants that are similar to the merchant 101 (e.g., similar restaurants). The customer metric management circuit 260 can determine the degree of similarity between merchants based on one or more of, for example, the types of goods or services sold at the merchants, the price range of the goods or services of the merchants, locations of the merchants, clientele served by the merchants, and the like. In some embodiments, the customer metric management circuit 260 can further determine the likely amount that the customer will spend at the merchant based on life events of the customer. For example, the customer metric management circuit 260 can determine that the customer received a raise or a bonus at work or an inheritance and increase the likely amount, or determine that the customer had a child and decrease the likely amount, and so on. In some embodiments, the customer metric management circuit 260 determines the likely amount the customer will spend based on the previous transactions between the customer and the merchant 101 (e.g., the customer metric management circuit 260 calculates an average of all or a subset of all the previous transactions).

In addition, in some embodiments, the customer metric management circuit 260 determines a predicted future cash flow for the merchant 101 based on customer probability models. For example, if a customer is predicted to have a 75% chance of returning to the merchant 101 within the next month, and the customer is determined to typically spend $100 at the merchant 101 (or at other similar merchants), the customer metric management circuit 260 predicts $75 of revenue in the next month from that customer (e.g., the probability of return of the customer multiplied by the predicted amount the customer will spend at the merchant 101). In some embodiments, the customer metric management circuit 260 performs revenue prediction for multiple customers for aggregation to determine a predicted revenue for the merchant 101 over a certain period of time.

In some embodiments, the customer metric management circuit 260 is further configured to generate and transmit suggestions regarding incentives to the merchant 101. In some arrangements, the financial institution computing system 242 includes the incentives database 270. The incentives database 270 is capable of storing and managing incentives information of customers of the merchant 101. In this regard, "incentives" refer to offers, coupons, or the like to be provided to customers of the merchant 101 to help increase a likelihood that the customer will return to the merchant 101. Incentives are offered based on the probability model (e.g., indicating the probability of return to the merchant 101 of a customer), as determined by the customer metric management circuit 260 with respect to the customer. In particular arrangements, incentives can be determined and offered based on the transaction history and social media activity of a customer (e.g., as stored in the account database 250 and social media database 252, respectively). The processor 244 can determine the incentives based on transaction activities and social media activity stored in one or more of the account database 250 or social media database 252. The processor 244 can store the incentives in the incentives database 270.

As an example, the customer metric management circuit 260 is configured to generate and provide an incentive based on a probability percentage of return to the merchant 101 of a customer. In some embodiments, the incentive is a discount for goods or services sold by the merchant 101 (e.g., a 15% off coupon, a buy one get one free coupon, etc.). In some embodiments, the customer metric management circuit 260 is configured to automatically generate the suggested incentive based on the probability of return of a customer. For example, the customer metric management circuit 260 can be configured to operate with respect to a probability threshold or trigger at which the customer metric management circuit 260 will generate an incentive. In some embodiments, the probability threshold is predetermined and set to a percentage (e.g., 15%, 25%, etc.), and when the customer metric management circuit 260 detects a probability percentage at or below the probability threshold, the customer metric management circuit 260 generates a suggested incentive with respect to the customer associated with the probability percentage at or below the probability threshold. In some embodiments, the customer metric management circuit 260 can calibrate a suggested amount of an incentive based on the probability of return of a customer. For example, if a probability of return is less than the probability threshold by a certain value (e.g., 5 percentage points), the customer metric management circuit 260 can attribute a particular discount to the incentive (e.g., 15% discount), but if a probability of return is less than the probability threshold by a higher value (e.g., 10 percentage points), the customer metric management circuit 260 can attribute a higher discount to the incentive (e.g., 20% discount), and so on.

In some embodiments, the customer metric management circuit 260 determines a level of influence of a customer based on social media presence. For example, a social media account is designated as having a special or elite status (e.g., due to the level of influence of the social media account). As another example, the customer metric management circuit 260 can categorize a social media account as having high influence based on the activity of the social media account (e.g., an account that this very active with postings, reviews, and the like), based on the number of connections associated with the account (e.g., an account that has a high number of friends), and the like. In some embodiments, the customer metric management circuit 260 determines that an account is a high influencer account, and so the customer metric management circuit 260 can generate incentives with respect to these high influencer customers to entice them to visit the merchant 101, so that the high influencer eventually posts about his experience with the merchant 101 on social media. In some embodiments, the customer metric management circuit 260 generates incentives for high influencer customers that are higher than those given to other customers. In some embodiments, the customer metric management circuit 260 can vary incentives for high influencer customers based on the level of influence of the customers (e.g., based on the number of connections of the customers, the status of the customers' social media accounts, and so on). For example, the customer metric management circuit 260 will suggest a higher value incentive for a customer based on social media accounts of a customer having more influence.

In some embodiments, the customer metric management circuit 260 is configured to detect "check-ins" by a customer of the financial institution (e.g., from a social media account associated with the customer) to determine whether the customer is currently visiting the merchant 101. The customer metric management circuit 260 can transmit an alert to the merchant 101 that a particular customer is currently visiting the merchant 101, along with information associated with the customer so that the merchant 101 can provide a particular set of treatments towards the customer based on information available to the customer metric management circuit 260. For example, the customer metric management circuit 260 can send information about the customer to the merchant 101, such as, whether the customer is a high influencer, whether the customer tends to leave many bad reviews of businesses, and so on. As such, the merchant 101 can provide services to the customer catered to the customer's social media and transaction history (e.g., if the customer tends to leave bad reviews of businesses, the merchant 101 can provide special treatment towards that customer during the customer's visit or after the visit, such as, sending follow-up incentives, following up with the customer to thank him for his business, and the like).

In some embodiments, the customer metric management circuit 260 can determine behaviors of a customer as they relate to the merchant 101. For example, the customer metric management circuit 260 can determine other merchants that are similar to merchant 101 (e.g., restaurants) that the a customer has been frequenting recently, which can indicate whether the customer is trending away from visiting the type of business of the merchant 101 (e.g., Italian restaurants), trending away from the location of the merchant 101, and the like. In some embodiments, the customer metric management circuit 260 determines that a customer is trending away from the merchant 101 by detecting that the customer is spending more time in another part of the city (e.g., by detecting locations of the customer transactions, social media check-ins, etc.). In some embodiments, the customer metric management circuit 260 is configured to generate a map of locations towards which the merchant 101 is losing customers. In some embodiments, the customer metric management circuit 260 can identify particular competitor merchants to which the merchant 101 is losing customers.

In some embodiments, the customer metric management circuit 260 is configured to determine an address associated with a customer (e.g., from information associated with the customer's social media account or financial account). Accordingly, the customer metric management circuit 260 can determine whether the customer has moved to a new location, which can help determine why a customer no longer visits the merchant 101. In some embodiments, the customer metric management circuit 260 adjusts the probability model of a customer that has moved (e.g., to 0% chance of return if the customer has moved sufficiently far away from the merchant 101). In some embodiments, the customer metric management circuit 260 determines that a customer lives near the merchant 101 (e.g., by comparing an address of the customer with that of the merchant 101 and by performing a lookup of a pre-stored map), and transmits this information to the merchant 101 (e.g., so that the merchant 101 can provide an incentive or can reach out to the customer). In some embodiments, the customer metric management circuit 260 determines that one or more customers that live near the merchant 101 are visiting a competitor merchant that is relatively far from the customers, and transmits this information to the merchant 101 so that the merchant 101 can investigate the reason why local customers are not visiting the merchant 101. In some embodiments, the customer metric management circuit 260 is configured to determine a location of a customer based on location information transmitted from a user device of the customer to the financial institution computing system 242 (e.g., global positioning system (GPS) location information).

In some embodiments, the customer metric management circuit 260 is configured to determine whether the merchant 101 is a special occasion merchant for a customer (e.g., a customer only visits the merchant 101 during, for example, a birthday or holiday). For example, the customer metric management circuit 260 can analyze the transaction history of a customer to determine that the customer visits the merchant 101 at certain times during the year or that the customer tends to spend more money at the merchant 101 relative to other competitor merchants. Accordingly, the customer metric management circuit 260 is configured to implement triggers that alert the merchant 101 of a customer's special occasion in an effort to draw that customer to the merchant 101. For example, the trigger can be set to correspond to a customer's birthday, wedding anniversary, a customer's friend's birthday, a known holiday, and so on (e.g., based on information retrieved from the customer's social media accounts).

In some embodiments, the customer metric management circuit 260 attributes a desirability indicator to a customer indicating the value of the customer to the merchant 101. The desirability indicator is based on a customer's tendency to leave negative or positive reviews of businesses, tendency to post about experiences on social media, level of influence on social media, how wealthy the customer is, and so on. As such, the customer metric management circuit 260 provides a ranking or otherwise indicate customers along with their respective level of desirability to the merchant 101, so that the merchant 101 can provide incentives for highly desirable customers and/or disincentives for lowly desirable customers. Incentives include sending coupons or offers to these highly desirable customers, while disincentives include sending nothing to the lowly desirable customers.

In some embodiments, the customer metric management circuit 260 identifies an address of a customer that has made a transaction at the merchant 101, and determines whether the customer is an out of town visitor or local customer. Accordingly, the customer metric management circuit 260 is configured to omit or disregard identified out of town customers from the probability models. In some embodiments, the customer metric management circuit 260 is configured to flag or otherwise identify those customers that are out of town for display to the merchant 101.

In some embodiments, the financial institution 140 transmits the incentives to a customer of the merchant 101 via the communication network 120. For example, the financial institution 140 transmits the incentive to a user device of the customer for use by the customer. The incentive is presented at the user device of the customer via an application associated with the financial institution 140 or with the merchant 101, via email, via text message, or the like.

As shown, the merchant 101 operates or is associated with the merchant device 110. In some arrangements, the merchant device 110 includes a processing circuit 202 including a processor 203 and memory 204. The processor 203 is implemented as a general-purpose processor, an ASIC, one or more FPGAs, a DSP, a group of processing components that are distributed over various geographic locations or housed in a single location or device, or other suitable electronic processing components. The memory 204 (e.g., RAM, NVRAM, ROM, Flash Memory, hard disk storage, etc.) stores data and/or computer code for facilitating the various processes described herein. Moreover, the memory 204 is or includes tangible, non-transient volatile memory or non-volatile memory. Accordingly, the memory 204 includes database components, object code components, script components, or any other type of information structure for supporting the various activities and information structures described herein.

The merchant device 110 is shown to include various circuits and logic for implementing the activities described herein. More particularly, the merchant device 110 includes one or more of a processing circuit 202, input/output circuit 205, network interface 206, incentives circuit 220, customer metrics application 280, or the like. While various circuits, interfaces, and logic with particular functionality are shown, it should be understood that the merchant device 110 includes any number of circuits, interfaces, and logic for facilitating the functions described herein. For example, the activities of multiple circuits are combined as a single circuit and implemented on a same processing circuit (e.g., the processing circuit 202), as additional circuits with additional functionality are included, etc.

The network interface 206 is configured for and structured to establish a communication session via the communication network 120 with the financial computing system 242. Accordingly, the network interface 206 is an interface such as, but not limited to, the network interface 248.

The input/output circuit 205 is configured to receive user input from and provide information to the merchant 101. In this regard, the input/output circuit 205 is structured to exchange data, communications, instructions, etc. with an input/output component of the merchant device 110. Accordingly, in some arrangements, the input/output circuit 205 includes an input/output device such as a display device, touchscreen, keyboard, microphone, and/or the like. In some arrangements, the input/output circuit 205 includes communication circuitry for facilitating the exchange of data, values, messages, and the like between the input/output device and the components of the merchant device 110. In some arrangements, the input/output circuit 205 includes machine-readable media for facilitating the exchange of information between the input/output device and the components of the merchant device 110. In still another arrangement, the input/output circuit 205 includes any combination of hardware components (e.g., a touchscreen), communication circuitry, and machine-readable media.

The customer metrics application 280 is communicably coupled to the financial institution computing system 242 via the communication network 120 and is structured to provide customer metrics of customers of the merchant 101 via the customer metrics application 280. In operation, in some embodiments, the merchant 101 initiates the customer metrics application 280 and provides a passcode (e.g., biometrics such as a thumbprint, a Personal Identification Number (PIN), a password, etc.) to authenticate the merchant 101 and select the source type of metrics desired. For example, the merchant 101 wishes to see a listing of those customers that have a high probability of returning to their business, those customers that are targets for providing incentives to increase likelihood of return, desirability indicators of customers, or the like.

As mentioned herein, the customer metrics application 280 is structured to provide customer metrics of customers of the merchant 101 via the customer metrics application 280. Accordingly, the customer metrics application 280 is communicably coupled via the network interface 206 over the communication network 120 to the financial institution computing system 242. As shown, the customer metrics application 280 includes a metrics management circuit 214 structured to display customer metrics, provide incentives to customers, or the like via the customer metrics application 280. For example, the metrics management circuit 214 enables the merchant 101 to select, view, filter, etc. customer metrics, while also enabling the merchant 101 to perform an action with respect to customers based on their metrics (e.g., send an incentive to those customer that have a relatively low likelihood of returning to the merchant 101).

In some arrangements, the merchant device 110 includes the incentives circuit 220. The incentives circuit 220 is operatively coupled to one or more of the components of the merchant device 110. In some examples, the incentives circuit 220 is coupled to the input/output circuit 205 to display information concerning the possible incentives to be sent to customers and to receive user input via the input/output circuit 205 relative to selection of one or more incentives presented. The incentives circuit 220 receives incentives from the incentives database 270 or the customer metric management circuit 260 of the financial institution computing system 242.

Figure 3:
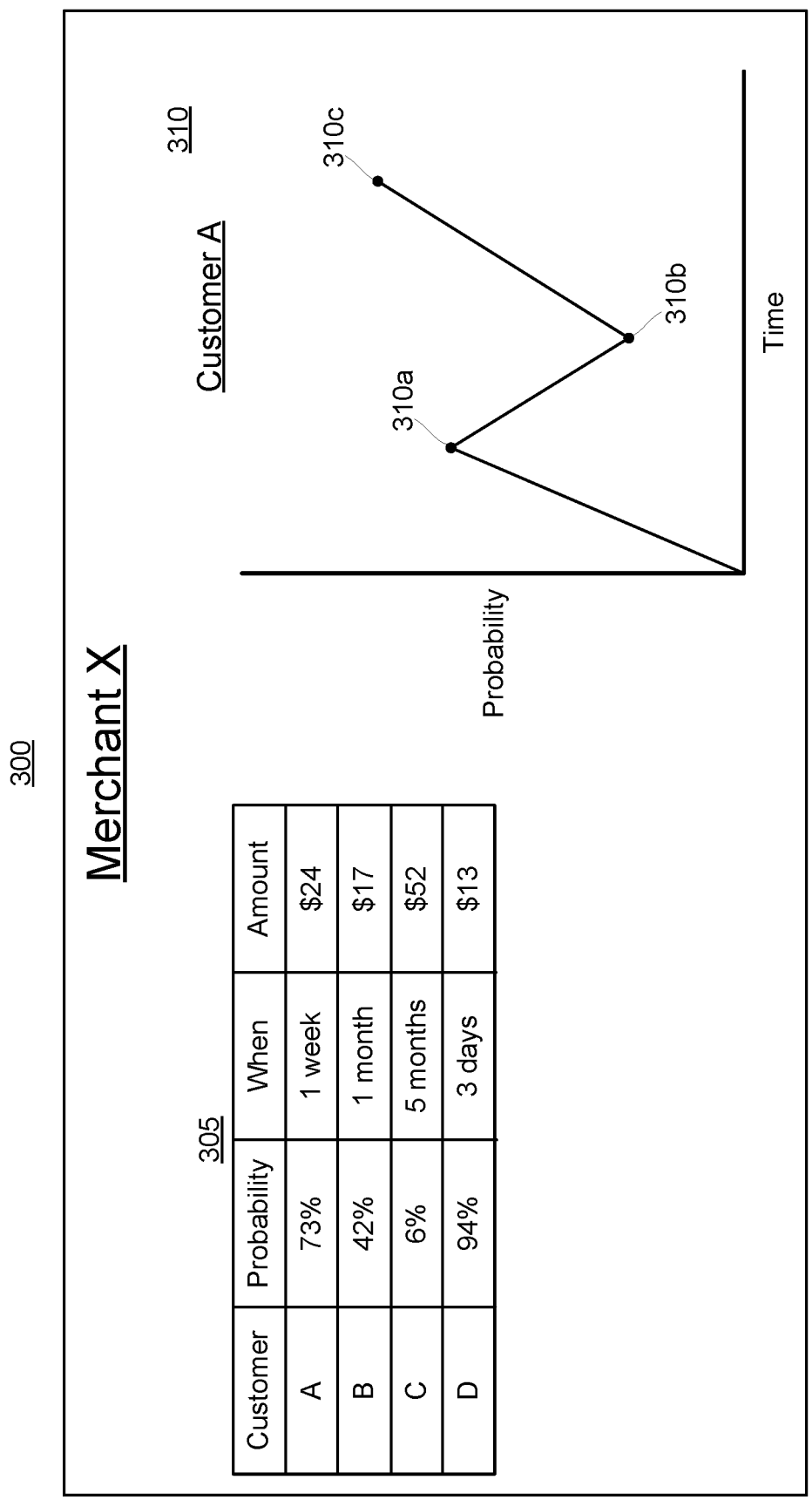
FIG. 3 is a dashboard for displaying customer metrics according to some embodiments.

FIG. 3 is a dashboard 300 for displaying customer metrics according to some embodiments. The dashboard 300 includes a customer metrics table 305, a probability model graph 310 of customer A, and an incentives button 315.

The customer metrics table 305 includes a first column for identifying a particular customer that has previously visited the merchant 101 (e.g., customer A, customer B, customer C, and customer D). The second column includes a probability (expressed in percentage) that a customer will return to the merchant 101. In some embodiments, the dashboard 300 indicates the percentage likelihood of return for a customer in relation to one or more time periods (e.g., a customer has a 30% chance of returning to the merchant 101 within the next month, a 50% chance of returning to the merchant 101 within the next three months, a 60% chance of returning to the merchant 101 within the next six months, and so on). The probability can be expressed in other forms, such as, but not limited to, a visual indicator expressing the customer's chance of return (e.g., a continuum illustrating a location along the continuum at which the customer stands, such as a probability line beginning at 0% likelihood and ending at 100% likelihood and including an indicator located along the probability line that represents the customer's likelihood of returning, for example, the customer's indicator is located in the middle of the probability line if the customer has a 50% chance likelihood of returning), a ratio, a fraction, and the like. The third column includes a time period after which the customer will likely return. In some embodiments, the third column is expressed as a date or other time at which the customer will likely return. The fourth column includes an amount that the customer will likely spend upon returning to the merchant 101.

In some embodiments, the probability model graph 310 illustrates the probability of return of a particular customer over time. For example, the probability model graph 310 illustrates that customer A had a relatively high probability of return to the merchant 101 at point 310a, but the probability decreased to point 310b (e.g., due to the customer metric management circuit 260 determining that customer A began visiting other competitor merchants). Subsequently, the probability of return to the merchant 101 of customer A increased to point 310c (e.g., due to the customer metric management circuit 260 determining that customer A wrote a positive review of merchant 101 on a social media website). Accordingly, customer A's most recent probability of return is depicted by point 310c (e.g., 73% chance of return based on the results illustrated in table 305).

Figure 4:
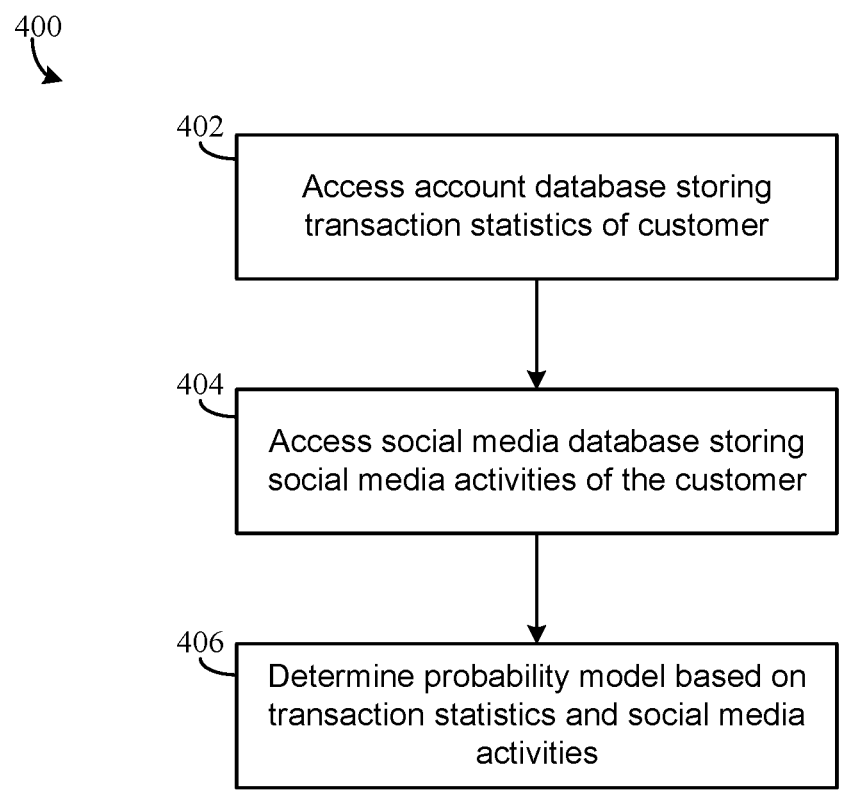
FIG. 4 is a flowchart of a method for determining customer metrics according to some embodiments.

FIG. 4 is a flowchart of a method 400 for determining customer metrics according to some embodiments. The method 400 is performed by a financial institution computing system (e.g., the financial institution computing system 140 of FIGS. 1 and 2).

In some embodiments, at step 402, an account database storing transaction statistics of a customer is accessed. In certain embodiments, the account database is part of a financial institution computing system (e.g., the account database 250 of the financial institution computing system 140). In certain embodiments, the account database is accessed by a customer metric management circuit of the financial institution computing system (e.g., the customer metric management circuit 260). In certain embodiments, the transaction information of the customer includes information about transaction amount, transaction date, transaction party, transaction location, and the like.

In some embodiments, at step 404, a social media database storing social media activities of a customer is accessed. In certain embodiments, the social media database is part of a financial institution computing system (e.g., the social media database 252 of the financial institution computing system 140). In certain embodiments, the social media database is accessed by a customer metric management circuit of the financial institution computing system (e.g., the customer metric management circuit 260). In certain embodiments, the social media information of the customer includes, one or more of an online posting, a review of a business, an indication of interest, a listing of a date of a special occasion, and the like.

In certain embodiments, at step 406, the customer metric management circuit determines a probability model of the customer based on the transaction statistics and the social media activities of the customer, the probability model indicating a probability that the customer will return to the merchant in the future. In some embodiments, the probability model further indicates a likely date of return of the customer, an amount that the customer will likely spend on the next visit, and the like. In some embodiments, the financial management computing system generates an incentive for the customer if the customer metric management circuit 260 determines that the probability of return of the customer to the merchant is sufficiently low.

Certain embodiments include non-transitory computer readable media having computer-executable instructions embodied therein that, when executed by financial institution computing system 140, including certain instructions executed by customer metric management circuit 260, causes the financial institution computing system 140 to perform operations described herein, or any operations that may be performed by any embodiments of financial institution computing system 140.

Certain embodiments described herein have been described with reference to drawings. The drawings illustrate certain details of embodiments that implement example systems, methods, non-transitory computer readable media having computer-executable instructions, and programs described herein. However, describing example embodiments with drawings should not be construed as imposing on the disclosure any limitations that may be present in the drawings. For example, elements shown in drawings may or may not be included in embodiments of the systems and methods herein.

It should be understood that no claim element herein is to be construed under the provisions of 35 U.S.C. § 112(f), unless the element is expressly recited using the phrase "means for."

It should be further understood that "or" should be construed as inclusive or, such that, for example, "A or B" means A, B, or A and B, and for example, "A, B, or C" means A, B, C, or any combination thereof (e.g., A and B, A and C, B and C).

It should be further understood that a database that may be described as two or more databases in the example embodiments or claims may be implemented as one database. It should be further understood that a database that may be described as one database in the example embodiments or claims may be implemented as two or more databases. It should be further understood that a circuit that may be described as two or more circuits in the example embodiments or claims may be implemented as one circuit. It should be further understood that a circuit that may be described as one circuit in the example embodiments or claims may be implemented as two or more circuits.

It should be further understood that "a" and "an" are not limited to a single instance and should be construed as "one or more," such that, for example, a database "storing information of a transaction" is a database storing information of one or more transactions.

As used herein, the term "circuit" may include hardware structured to execute the functions described herein. In some embodiments, each respective "circuit" may execute, or include machine-readable media for configuring the hardware to execute, the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices, including but not limited to devices such as those described herein, any other input devices capable of performing a similar function, and any other input devices that may be used with a computing device. Comparatively, the term "output device," as described herein, may include any type of output device or output devices, including but not limited to devices such as those described herein, any other output devices capable of performing a similar function, and any other output devices that may be used with a computing device.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined and form part of the same step, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of example embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain examples of the disclosure and its practical application to enable one skilled in the art to utilize various embodiments and with various modifications as may be suited to any particular use contemplated. Other substitutions, modifications, changes, and omissions may be made in the design, operating conditions, and arrangement of the embodiments without departing from the scope of the present disclosure as expressed in the appended claims.

What is claimed is:

1. A computing system comprising:
   an account database configured to store a plurality of transaction statistics with respect to a financial account of a customer, at least one of the plurality of transaction statistics indicative of a first transaction between the customer and a merchant;
   a social media database configured to store a plurality of social media activities of the customer; and
   a customer metric management circuit configured to:
      parse information from a social media account associated with the customer to selectively retrieve relevant information, wherein the relevant information is (i) information that pertains to at least one of the merchant, to a competitor of the merchant, or to an industry in which the merchant conducts business, (ii) location information of the customer, and (iii) a sentiment exhibited by the customer towards the merchant or another business, wherein the information about the customer includes at least one of a birthday or a life event;
      identify a residential address of the customer from the relevant information parsed from the social media account associated with the customer;
      determine an eligibility of the customer to receive an incentive based on the residential address of the customer, wherein the customer is eligible if the residential address is in the same geographic area as the merchant, and wherein the customer is not eligible if the residential address is in a different geographic area as the merchant, and wherein the system flags an ineligible customer as being ineligible, the flag provided to the merchant in any subsequent recommendations;
      determine a probability model of the customer based on the plurality of transaction statistics and the plurality of social media activities of the customer, the probability model indicating a first probability that the customer will conduct a second transaction with the merchant within a first future time period and a second probability that the customer will conduct the second transaction with the merchant within a second future time period ending later than the first future time period;
      adjust a value of the probability model in response to detecting the sentiment exhibited by the customer, wherein the probability model increases responsive to detecting a positive sentiment and decreases responsive to detecting a negative sentiment, wherein the positive sentiment includes one or more of posting an online positive review of the merchant, detecting a regular pattern of transactions with the merchant over time, posting a negative review of a competitor of the merchant, living proximate to the merchant, or indicating interest in a web page or application associated with the merchant;
      determine a desirability score for the customer, wherein the desirability score is based on a tendency for the customer to post a positive merchant review, a tendency to post about a merchant experience on social media, a level of social media influence of the customer, and an income level of the customer;
      create a special occasion designation for the customer, wherein the special occasion designation is based on at least one of a certain time of year that the customer has visited the merchant based on a transaction history of the customer and a known special occasion of the customer based on information retrieved from the social media account;
      recommend an incentive for the customer based on the eligibility of the customer, the probability model, the special occasion designation, and the desirability score;
      calibrate the incentive based on a probability threshold, wherein the incentive is greater when the probability model is less than the probability threshold by a higher value than when the probability model is less than the probability threshold by a lesser value;

generate a dashboard comprising a customer metrics table, a probability model graph, and an incentives button, wherein the customer metrics table includes the first probability that the customer will conduct the second transaction within the first future time period and the second probability that the customer will conduct the second transaction within the second future time period, and wherein the probability model graph illustrates the probability of return of the customer over time;

provide the dashboard to a merchant device;

provide a recommendation to the merchant device based on the customer being eligible, the recommendation including the eligibility of the customer, the probability model of the customer, the desirability score, the special occasion designation, and the incentive; and the merchant device, wherein the merchant device is configured to provide the incentive to the customer during a checkout process by applying the incentive to a purchase price associated with a transaction.

2. The computing system of claim 1, wherein each of the plurality of transaction statistics indicates one or more of an amount, a location, a date, and an identity of another party associated with the transaction.

3. The computing system of claim 1, wherein each of the social media activities includes one or more of an online posting, a review of a business, an indication of interest, and a listing of a date of a special occasion.

4. The computing system of claim 1, wherein the negative sentiment includes one or more of posting an online negative review of the merchant, conducting a transaction with a competitor of the merchant, discussing products or services different from those provided by the merchant online, and posting an online positive review of a competitor of the merchant.

5. The computing system of claim 1, wherein the probability model further includes an estimated time of the second transaction, the estimated time of the second transaction determined by detecting a pattern of transactions at the merchant or determining a date of a special occasion of the customer.

6. The computing system of claim 1, wherein the probability model further includes an estimated amount of the second transaction, the estimated amount determined based on amounts of transactions the customer made with businesses that sell similar goods or services as the merchant, whether the customer received a raise or a bonus, whether the customer had a child or got married, and previous transactions between the customer and the merchant.

7. The computing system of claim 1, wherein the incentive includes a coupon or an offer for a discount on goods or services provided by the merchant.

8. The computing system of claim 1, wherein the customer metric management circuit is further configured to recommend a higher value incentive in correlation with a lower probability that the customer will conduct the second transaction with the merchant.

9. The computing system of claim 1, wherein the customer metric management circuit is further configured to:
determine whether the first probability or the second probability is less than the probability threshold; and
in response to determining that the first or the second probability is less than the probability threshold, recommend the incentive for the customer and provide the recommendation to the merchant for distribution of the incentive to the customer.

10. The computing system of claim 1, wherein the incentive is provided to the customer via a user device via an application associated with a financial institution or the merchant.

11. The computing system of claim 1, wherein the merchant device is configured to provide the incentive to the customer at a point of sale.

12. A method performed by a computing system, the method comprising:
accessing, by a customer metric management circuit, an account database storing a plurality of transaction statistics with respect to a financial account of a customer, at least one of the plurality of transaction statistics indicative of a first transaction between the customer and a merchant;

accessing, by the customer metric management circuit, a social media database storing a plurality of social media activities of the customer;

parsing information from a social media account associated with the customer to selectively retrieve relevant information, wherein the relevant information is (i) information that pertains to at least one of the merchant, to a competitor of the merchant, or to an industry in which the merchant conducts business, (ii) location information of the customer, and (iii) a sentiment exhibited by the customer towards the merchant or another business, wherein the information about the customer includes at least one of a birthday or a life event;

identifying, by the customer metric management circuit, a residential address of the customer from the relevant information parsed from the social media account associated with the customer;

determining, by the customer metric management circuit, an eligibility of the customer to receive an incentive based on the residential address of the customer, wherein the customer is eligible if the residential address is in the same geographic area as the merchant, and wherein the customer is not eligible if the residential address is in a different geographic area as the merchant, and wherein the system flags an ineligible customer as being ineligible, the flag provided to the merchant in any subsequent recommendations;

determining, by the customer metric management circuit, a probability model of the customer based on the plurality of transaction statistics and the plurality of social media activities of the customer, the probability model indicating a first probability that the customer will conduct a second transaction with the merchant within a first future time period and a second probability that the customer will conduct the second transaction with the merchant within a second future time period ending later than the first future time period;

adjusting a value of the probability model in response to detecting the sentiment exhibited by the customer, wherein the probability model increases responsive to detecting a positive sentiment and decreases responsive to detecting a negative sentiment, wherein the positive sentiment includes one or more of posting an online positive review of the merchant, detecting a regular pattern of transactions with the merchant over time, posting a negative review of a competitor of the merchant, living proximate to the merchant, or indicating interest in a web page or application associated with the merchant;

determining, by the customer metric management circuit, a desirability score for the customer, wherein the desirability score is based on a tendency for the customer to post a positive merchant review, a tendency to post about a merchant experience on social media, a level of social media influence of the customer, and an income level of the customer;

creating a special occasion designation for the customer, wherein the special occasion designation is based on at least one of a certain time of year that the customer has visited the merchant based on a transaction history of the customer and a known special occasion of the customer based on information retrieved from the social media account;

recommending, by the customer metric management circuit, an incentive for the customer based on the eligibility of the customer, the probability model, the special occasion designation, and the desirability score;

calibrating the incentive based on a probability threshold, wherein the incentive is greater when the probability model is less than the probability threshold by a higher value than when the probability model is less than the probability threshold by a lesser value;

generating a dashboard comprising a customer metrics table, a probability model graph, and an incentives button, wherein the customer metrics table includes the first probability that the customer will conduct the second transaction within the first future time period and the second probability that the customer will conduct the second transaction within the second future time period, and wherein the probability model graph illustrates the probability of return of the customer over time;

providing the dashboard to a merchant device;

providing, by the customer metric management circuit, a recommendation to the merchant device based on the customer being eligible, the recommendation including the eligibility of the customer, the incentive, the desirability score, the special occasion designation, and the probability model; and providing, by the merchant device, the incentive to the customer during a checkout process by applying the incentive to a purchase price associated with a transaction.

13. The method of claim 12, wherein each of the plurality of transaction statistics indicates one or more of an amount, a location, a date, and an identity of another party associated with the transaction.

14. The method of claim 12, wherein each of the social media activities includes one or more of an online posting, a review of a business, an indication of interest, and a listing of a date of a special occasion.

15. The method of claim 12, wherein the negative sentiment includes one or more of posting an online negative review of the merchant, conducting a transaction with a competitor of the merchant, discussing products or services different from those provided by the merchant online, and posting an online positive review of a competitor of the merchant.

16. The method of claim 12, wherein the probability model further includes an estimated time of return to the merchant by the customer, the estimated time of return determined by detecting a pattern of transactions at the merchant or determining a date of a special occasion of the customer.

17. The method of claim 12, wherein the probability model further includes an estimated amount of the second transaction, the estimated amount determined based on amounts of transactions the customer made with businesses that sell similar goods or services as the merchant, whether the customer received a raise or a bonus, whether the customer had a child or got married, and previous transactions between the customer and the merchant.

18. The method of claim 12, wherein the incentive includes a coupon or an offer for a discount on goods or services provided by the merchant.

19. The method of claim 12, further comprising recommending, by the customer metric management circuit, a higher value incentive in correlation with a lower probability that the customer will conduct the second transaction with the merchant.

20. The method of claim 12, further comprising:

determining, by the customer metric management circuit, whether the first probability or the second probability is less than the probability threshold; and in response to determining that the first or the second probability is less than the probability threshold, recommending, by the customer metric management circuit, the incentive for the customer and providing, by the customer metric management circuit, the recommendation to the merchant for distribution of the incentive to the customer.

21. A non-transitory computer readable media having computer-executable instructions embodied therein that, when executed by a customer metric management circuit of a computing system, causes the computing system to perform operations, the operations comprising:

accessing, by the customer metric management circuit, an account database storing a plurality of transaction statistics with respect to a financial account of a customer, at least one of the plurality of transaction statistics indicative of a first transaction between the customer and a merchant;

accessing, by the customer metric management circuit, a social media database storing a plurality of social media activities of the customer;

parsing information from a social media account associated with the customer to selectively retrieve relevant information, wherein the relevant information is (i) information that pertains to at least one of the merchant, to a competitor of the merchant, or to an industry in which the merchant conducts business, (ii) location information of the customer, and (iii) a sentiment exhibited by the customer towards the merchant or another business, wherein the information about the customer includes at least one of a birthday or a life event;

identifying, by the customer metric management circuit, a residential address of the customer from the relevant information parsed from the social media account associated with the customer;

determining, by the customer metric management circuit, an eligibility of the customer to receive an incentive based on the residential address of the customer, wherein the customer is eligible if the residential address is in the same geographic area as the merchant, and wherein the customer is not eligible if the residential address is in a different geographic area as the merchant, and wherein the system flags an ineligible customer as being ineligible, the flag provided to the merchant in any subsequent recommendations;

determining, by the customer metric management circuit, a probability model of the customer based on the plurality of transaction statistics and the plurality of social media activities of the customer, the probability model indicating a first probability that the customer will conduct a second transaction with the merchant within a first future time period and a second probability that the customer will conduct the second transaction with the merchant within a second future time period ending later than the first future time period;

adjusting a value of the probability model in response to detecting the sentiment exhibited by the customer, wherein the probability model increases responsive to detecting a positive sentiment and decreases responsive to detecting a negative sentiment, wherein the positive sentiment includes one or more of posting an online positive review of the merchant, detecting a regular pattern of transactions with the merchant over time, posting a negative review of a competitor of the merchant, living proximate to the merchant, or indicating interest in a web page or application associated with the merchant;

determining, by the customer metric management circuit, a desirability score for the customer, wherein the desirability score is based on a tendency for the customer to post a positive merchant review, a tendency to post about a merchant experience on social media, a level of social media influence of the customer, and an income level of the customer;

creating a special occasion designation for the customer, wherein the special occasion designation is based on at least one of a certain time of year that the customer has visited the merchant based on a transaction history of the customer and a known special occasion of the customer based on information retrieved from the social media account;

recommending, by the customer metric management circuit, an incentive for the customer based on the eligibility of the customer, the probability model, the special occasion designation, and the desirability score;

calibrating the incentive based on a probability threshold, wherein the incentive is greater when the probability model is less than the probability threshold by a higher value than when the probability model is less than the probability threshold by a lesser value;

generating a dashboard comprising a customer metrics table, a probability model graph, and an incentives button, wherein the customer metrics table includes the first probability that the customer will conduct the second transaction within the first future time period and the second probability that the customer will conduct the second transaction within the second future time period, and wherein the probability model graph illustrates the probability of return of the customer over time;

providing the dashboard to a merchant device; and providing, by the customer metric management circuit, a recommendation to the merchant device based on the customer being eligible, the recommendation including the eligibility of the customer, the incentive, the desirability score, the special occasion designation, and the probability model;

wherein the merchant device is configured to provide the incentive to the customer during a checkout process by applying the incentive to a purchase price associated with a transaction.

\* \* \* \* \*